(12) United States Patent
Aguirrezabal

(10) Patent No.: US 8,403,282 B2
(45) Date of Patent: Mar. 26, 2013

(54) CLAMP DEVICE

(75) Inventor: Iñigo Gisbert Aguirrezabal, Hondarribia (ES)

(73) Assignee: Tien Hsin Industries Co., Ltd., Taichung County (TW)

( * ) Notice: Subject to any disclaimer, the term of this patent is extended or adjusted under 35 U.S.C. 154(b) by 225 days.

(21) Appl. No.: 12/876,327

(22) Filed: Sep. 7, 2010

(65) Prior Publication Data

US 2012/0056049 A1 Mar. 8, 2012

(51) Int. Cl.
*E04G 5/06* (2006.01)
(52) U.S. Cl. ......... 248/231.51; 248/229.13; 248/229.23; 248/227.3; 248/230.4; 248/316.5; 211/17
(58) Field of Classification Search ............. 248/231.51, 248/229.13, 229.23, 227.3, 228.4, 230.4, 248/316.5, 70, 74.1, 74.4, 214, 231.61, 230.5, 248/228.5, 229.24, 229.14; 211/17
See application file for complete search history.

(56) References Cited

U.S. PATENT DOCUMENTS

| | | | | |
|---|---|---|---|---|
| 1,547,065 A * | 7/1925 | Noble | ...................... | 248/229.13 |
| 1,895,156 A * | 1/1933 | Fisher | ........................ | 248/316.5 |
| 2,212,156 A * | 8/1940 | Erdley | ...................... | 248/229.13 |
| 3,047,263 A * | 7/1962 | Mittenzwei | ...................... | 248/72 |
| 3,664,621 A * | 5/1972 | Savoie, Jr. | .................... | 248/74.1 |
| 4,188,834 A | 2/1980 | Wakatsuki et al. | ............. | 74/489 |
| 5,779,119 A * | 7/1998 | Talbot et al. | .................. | 224/427 |
| 5,966,993 A | 10/1999 | Ekins | .......................... | 74/502.2 |
| 6,494,327 B2 * | 12/2002 | Huang | ............................. | 211/17 |
| 6,964,400 B2 * | 11/2005 | Lu | ............................. | 248/316.5 |
| 7,666,210 B2 * | 2/2010 | Franck et al. | ................. | 606/250 |

* cited by examiner

*Primary Examiner* — Anita M King
(74) *Attorney, Agent, or Firm* — Alan Kamrath; Kamrath IP Lawfirm, P.A.

(57) ABSTRACT

A clamp device includes a frame including a supporting portion formed on one end thereof. The supporting portion is adapted for abutting against a handle tube. A clamping unit includes two clamping elements. Each clamping element has a connecting portion on one end, a coupling portion on the other end opposite to the connecting portion, and a curved portion between the connecting portion and the coupling portion. The clamping unit is pivotally moved between an open position and a clamping position. The clamping elements are detached from each other in the open position, and the clamping elements are close to each other in the clamping position.

13 Claims, 11 Drawing Sheets

CLAMP DEVICE

BACKGROUND OF THE INVENTION

1. Field of the Invention

The present invention relates generally to a clamp device and, more particularly, to a clamp device having two symmetrical mounting elements installed thereon.

2. Description of the Related Art

U.S. Pat. No. 4,188,834 discloses a brake operating part including a supporting bracket. The supporting bracket is substantially circular shaped and has a through hole formed thereon. The through hole is adapted for mounting to a steering handle tube. The supporting bracket further has a gap on one side thereof and a screw associated with the gap. The inner diameter of the supporting bracket is adjustable, and the supporting bracket can be tightly mounted onto the steering handle tube via the screw. However, the supporting bracket is made of one piece, so that adjusting the inner diameter is difficult. Furthermore, the gap is formed on one side of the supporting bracket so that the supporting bracket, is delimited for a specific side of the steering handle tube. In other words, the right supporting bracket is adapted for mounting onto the right side of the steering handle tube, and vice-versa. Different sides of the supporting brackets are not interchangeable with each other, so that the manufacturing cost is increased.

U.S. Pat. No. 5,966,993 discloses a cable adjusting mechanism including a supporting frame and a handlebar clamp associated with the supporting frame. The supporting frame and the handlebar clamp form a mounting hole for mounting the cable adjusting mechanism to a handlebar. The supporting frame has two openings extending from one end thereof adjacent to the handlebar clamp. The handlebar clamp has two through holes corresponding to the openings of the supporting frame. Two bolts are respectively inserted through the through holes and openings. The two bolts are utilized to prevent the handlebar clamp from detaching from the supporting frame. In this case, when a user wants to install the mechanism onto the handlebar, the user has to catch the supporting frame, the handlebar clamp, and the bolts simultaneously. The user further has to operate a wrench to fasten the bolts. It is inconvenient to complete the installation.

The present invention is, therefore, intended to obviate or at least alleviate the problems encountered in the prior art.

SUMMARY OF THE INVENTION

According to the present invention, the main purpose is to provide a clamp device which includes a frame including a connecting portion formed on one end thereof. The connecting portion is adapted for abutting against a handle tube. A clamping unit includes two clamping elements. Each clamping element has a connecting portion on one end, a coupling portion on the other end opposite to the connecting portion, and a curved portion between the connecting portion and the coupling portion. The clamping unit is pivotally moved between an open position and a clamping position. The clamping elements are detached from each other in the open position, and the clamping elements are close to each other in the clamping position.

An advantage of the clamp device according to the present invention is that each clamping element has a profile the same with each other, so that the brake lever clamp can be installed onto both sides of the handle tube.

Another advantage of the clamp device according to the present invention is that when the clamping unit is in the open position, the clamping elements are detached from each other to facilitate the installation of the handle tube.

Another advantage of the clamp device according to the present invention is that the clamping unit is able to tightly mount onto the handle tube since the first axis is perpendicular with respect to the second axis and is parallel with respect to the third axis.

A further advantage of the clamp device according to the present invention is that the slants can prevent the curved portions of the clamping elements from interfering with the frame and from enlarging the moving area of the clamping elements.

Other advantages and features of the present invention will become apparent from the following description referring to the drawings.

DETAILED DESCRIPTION OF THE PREFERRED EMBODIMENTS

Figure 1:
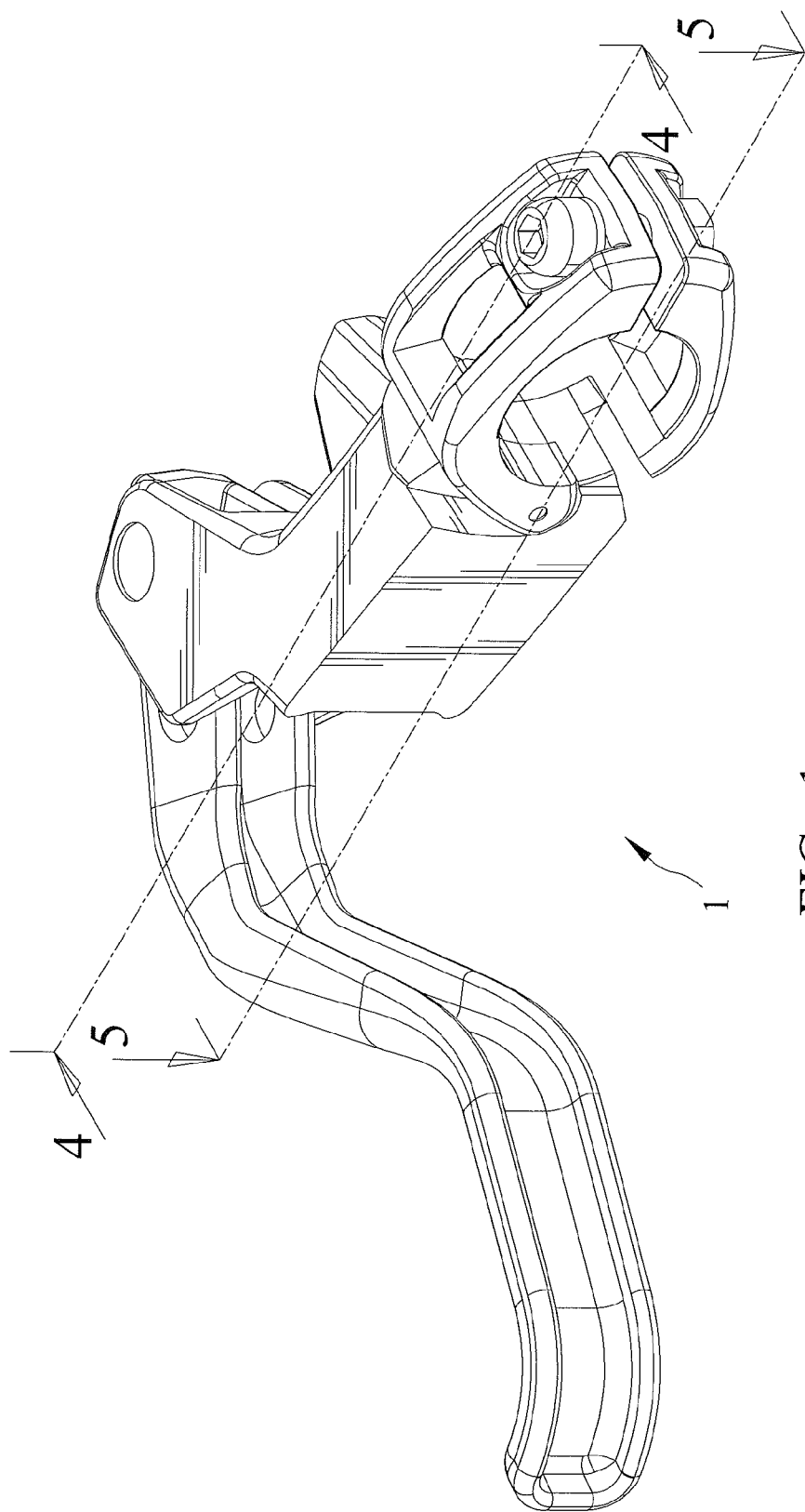
FIG. 1 is a perspective view of a clamp device according to a first embodiment of the present invention.
Figure 2:
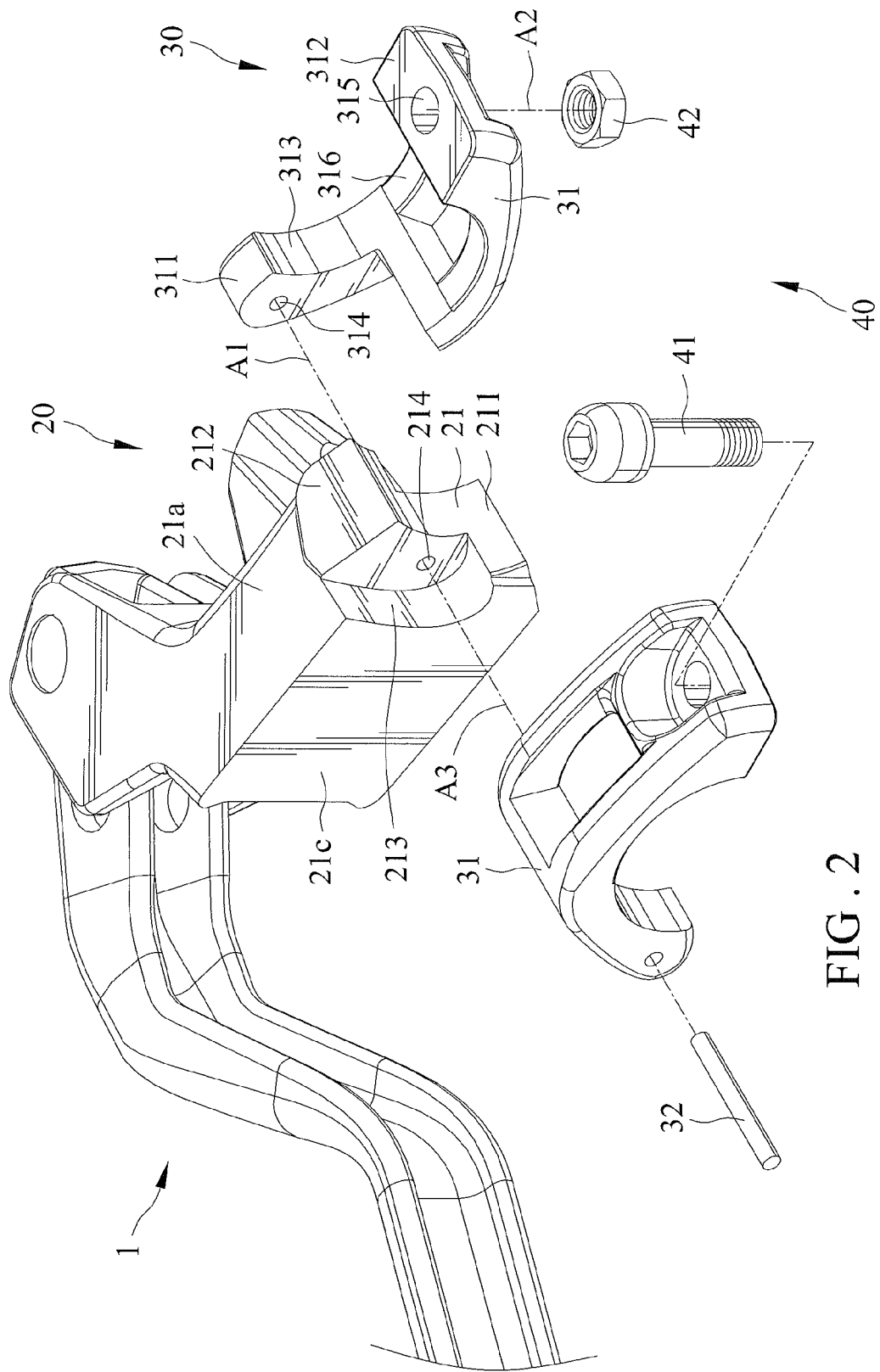
FIG. 2 is an exploded perspective view of the clamp device according to the first embodiment of the present invention.
Figure 3:
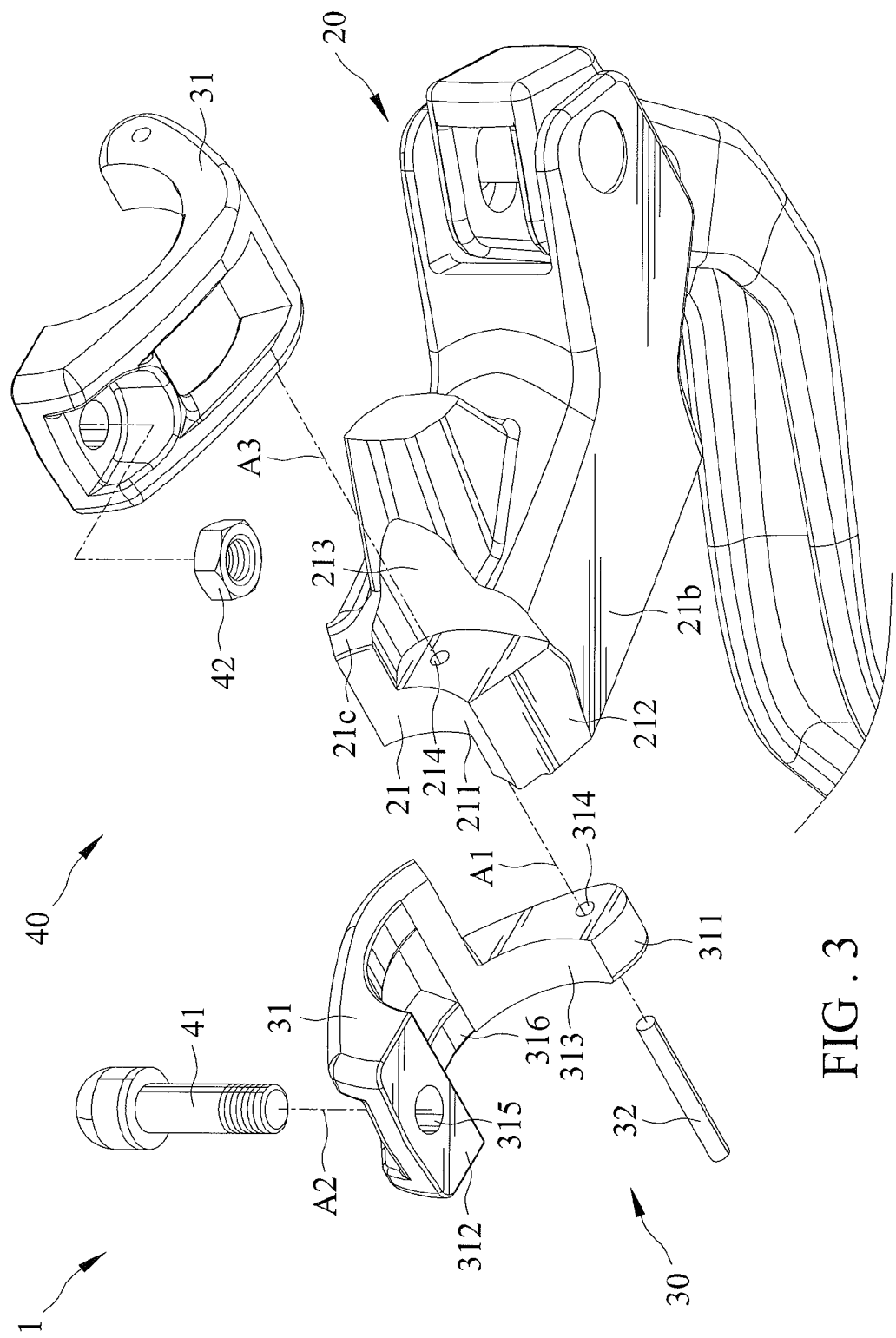
FIG. 3 is another exploded perspective view of the clamp device according to the first embodiment of the present invention.
Figure 4:
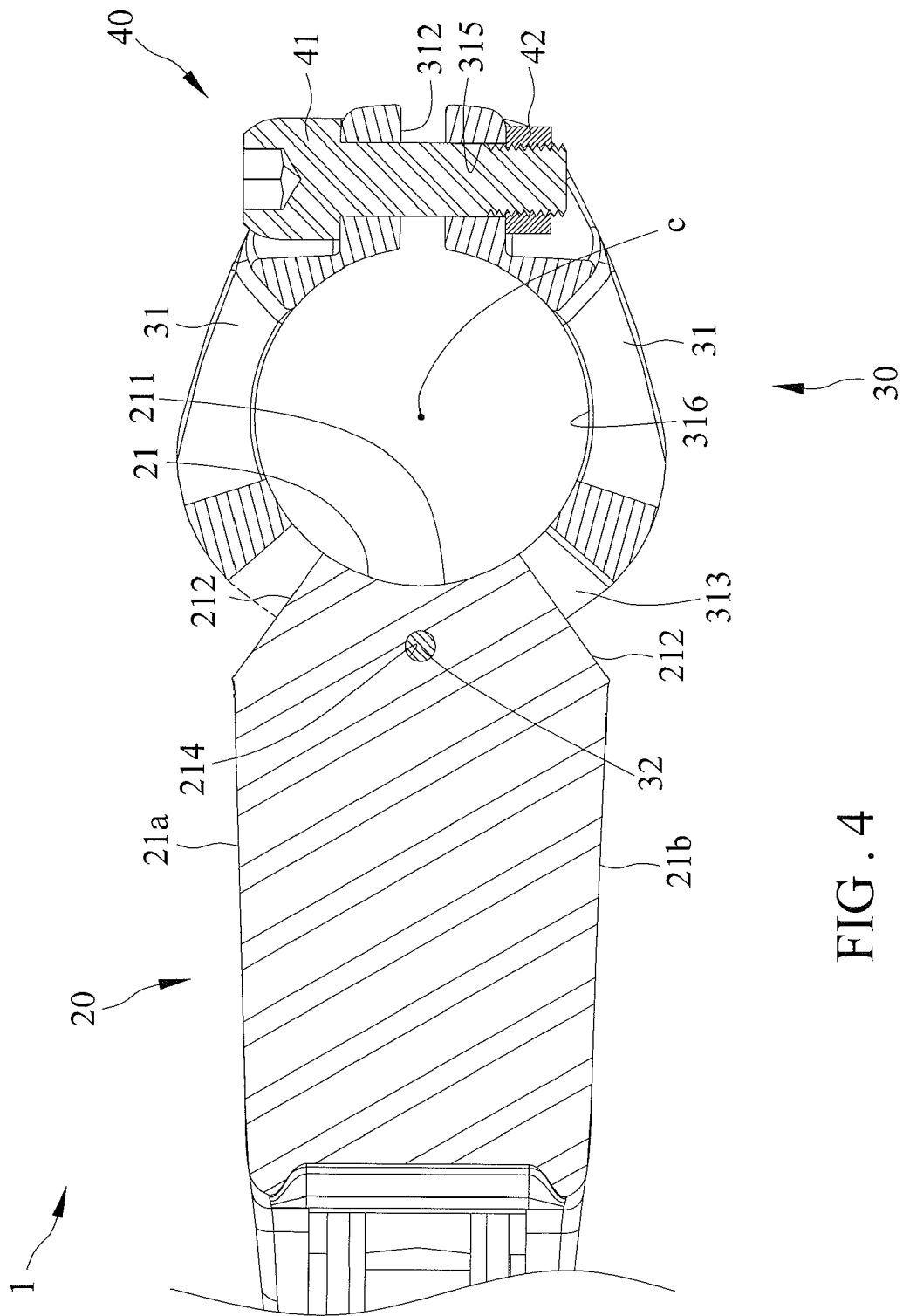
FIG. 4 is a cross-sectional view taken along 4-4 in FIG. 1.
Figure 5:
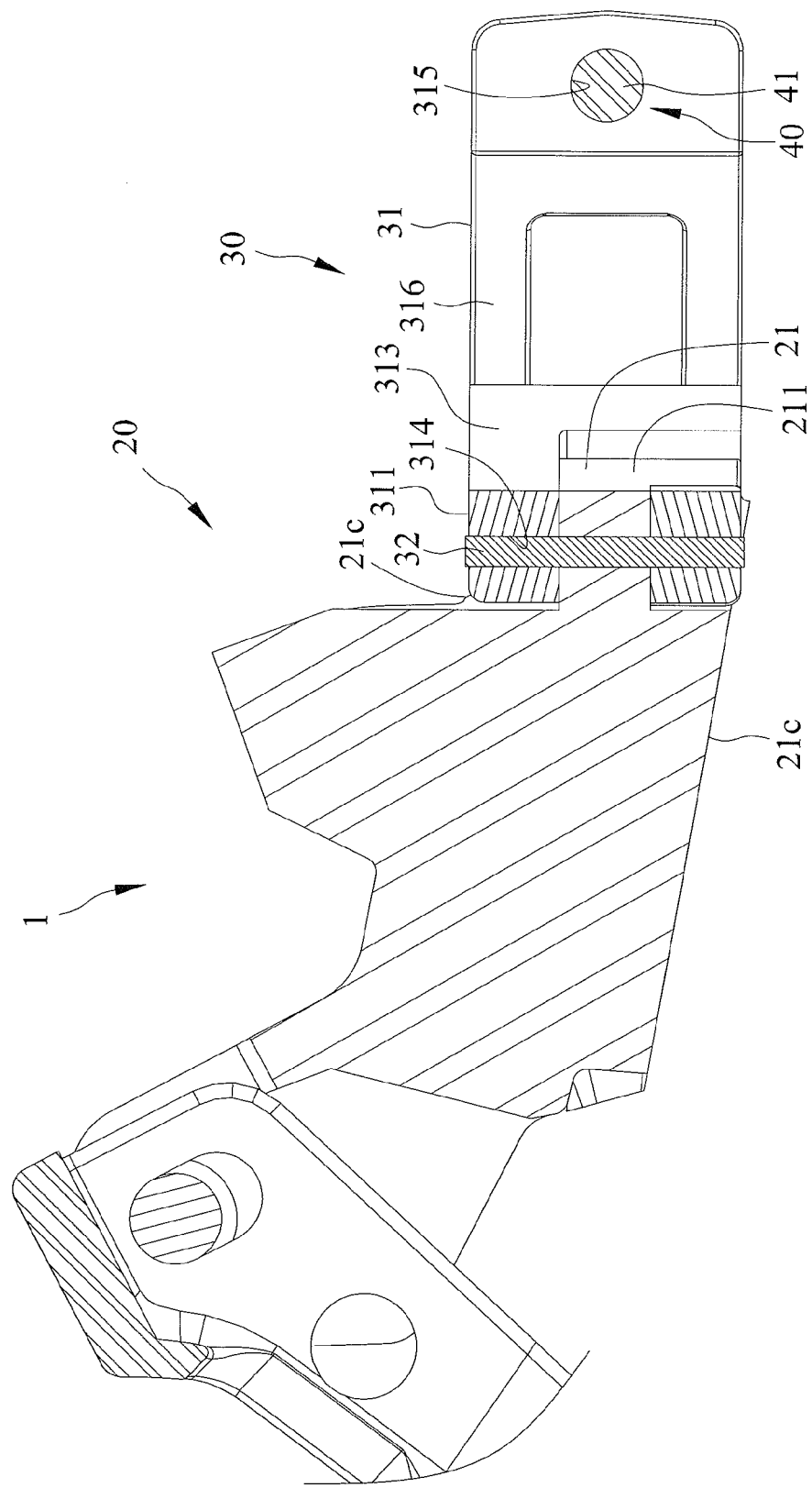
FIG. 5 is a cross-sectional view taken along 5-5 in FIG. 1.

The present invention will be described through detailed illustration of two embodiments referring to the drawings.

Referring to FIG. 1 through FIG. 5, there is shown a clamp device 1 according to a first embodiment of the present invention. The clamp device 1 comprises a frame 20 associated with a lever (not labeled), a clamping unit 30 pivotally connected to the frame 20, and a fastener 40 installed to the clamping unit 30.

The frame 20 includes a supporting portion 21 formed on one end thereof a distal from the lever. The supporting portion 21 has a curved surface 211 on a distal end thereof. The curved surface 211 is adapted for abutting against a handle tube and has a center C defined thereon. The supporting portion 21 has a first side 21a, a second side 21b opposite to the first side 21a, and two lateral sides 21c opposite to each other, and the lateral sides 21c extend between the first side 21a and the second side 21b. In the embodiment, each of the first and second sides 21a, 21b forms a slant 212. The tangent plane of the slant 212 crosses the center C. Consequently, the supporting portion 21 has an aperture 214 extending from one lateral side 21c to the other one. The supporting portion 21 further forms two recesses 213 on the lateral sides 21c, respectively. Each recess 213 is in communication with an end of the aperture 214.

The clamping unit 30 includes two clamping elements 31, and a pin 32 utilized to connect clamping elements 31 and the supporting portion 21 of the frame 20. Preferably, each clamping element 31 has a profile the same with each other. Each clamping element 31 has a connecting portion 311 on one end and a coupling portion 312 on the other end opposite to the connecting portion 311. The connecting portion 311 is adapted for connecting to the frame 20. The connecting portion 311 forms a pivoting arm 313 corresponding to the recess 213 of the frame 20. The pivoting arm 313 forms a through hole 314 corresponding to the aperture 214 of the frame 20. The pin 32 is inserted through the aperture 214 and the through hole 314 so that the clamping elements 31 can be pivotally connected to the frame 20. The coupling portion 312 has an opening 315 adapted for associating with the fastener 40. Preferably, the through hole 314 has a first axis A1 along the longitudinal axle thereof, the opening 315 has a second axis A2 perpendicular to the longitudinal axle thereof, and the aperture 214 has a third axis A3 along the longitudinal axle thereof. The first axis A1 is perpendicular with respect to the second axis A2, and is parallel with respect to the third axis A3.

Each clamping element 31 further has a curved portion 316 between the connecting portion 311 and the coupling portion 312. The curved portions 316 are utilized to abut against the handle tube. Preferably, each curved portion 316 has a curvature radius the same as that of the curved surface 211 of the frame 20.

The fastener 40 includes a screw 41 inserted through the opening 315 of the clamping unit 30 and a nut 42 mounted on the screw 41. The screw 41 abuts against one of the clamping elements 31, and the nut 42 abuts against the other one of the clamping elements 31. The clamping unit 30 is able to tightly mount onto the handle tube, since the first axis A1 is perpendicular with respect to the second axis A2 and is parallel with respect to the third axis A3.

Figure 6:
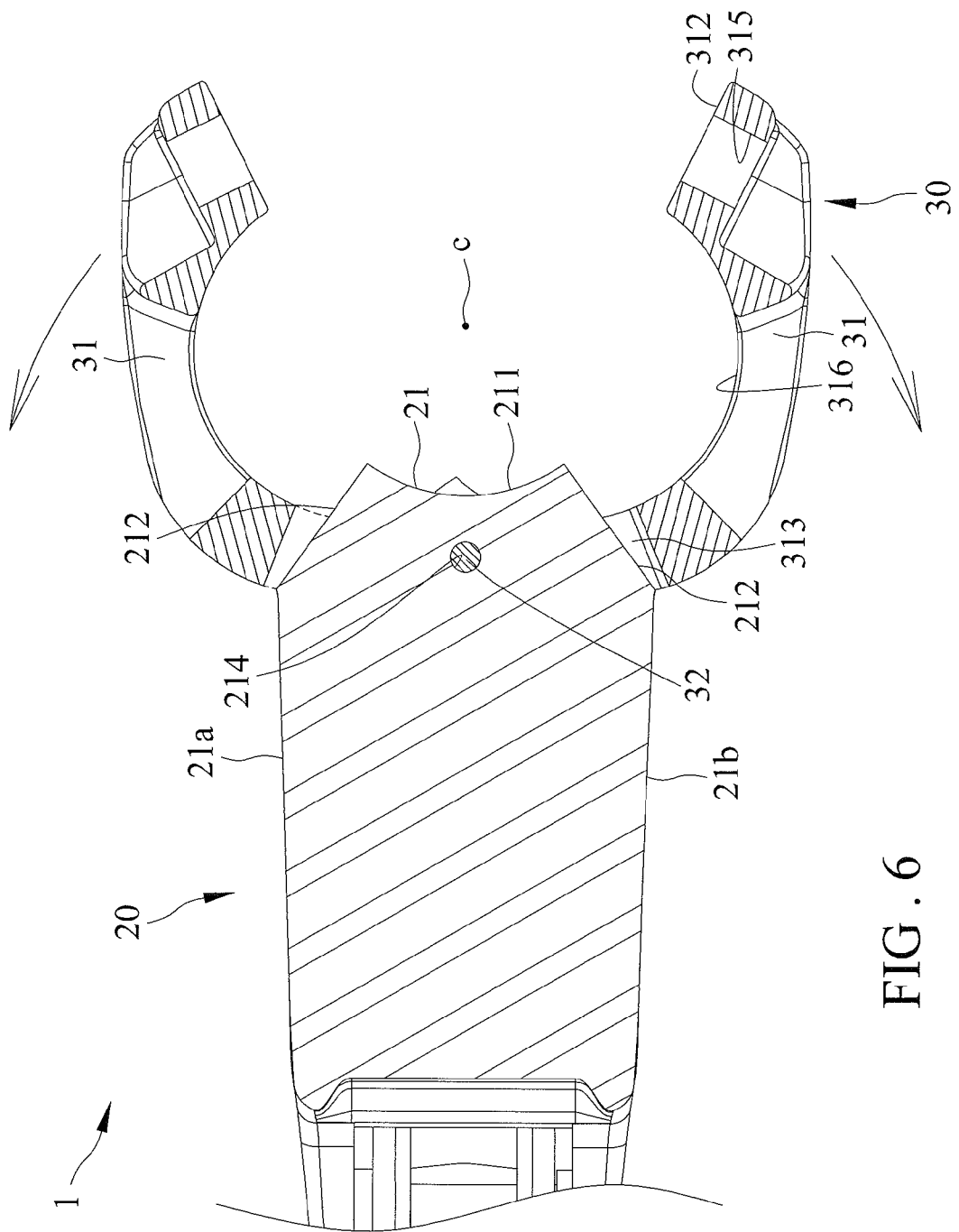
FIG. 6 illustrates a clamping unit in an open position.
Figure 7:
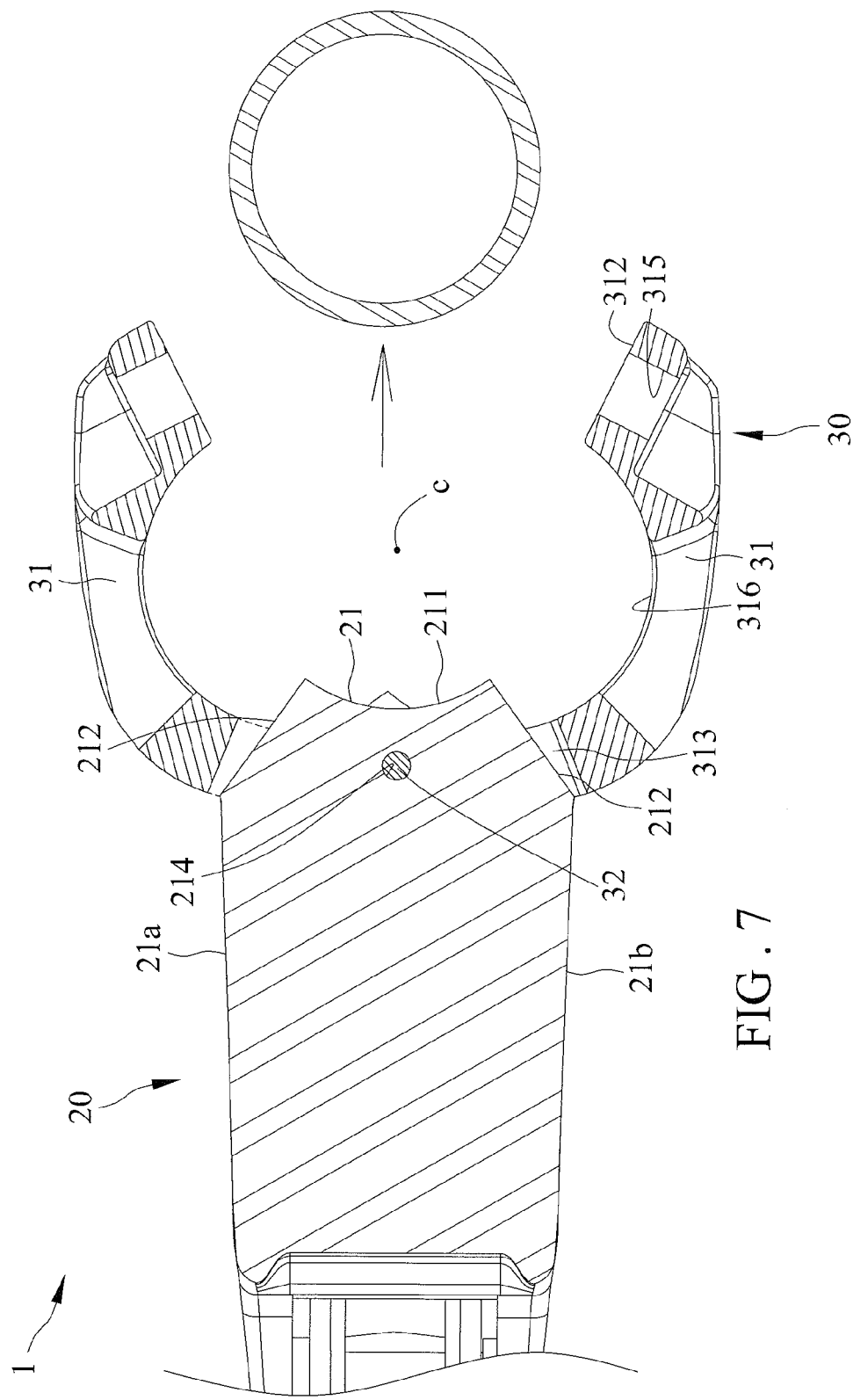
FIG. 7 illustrates the installation of a handle tube, in which the clamping unit is in the open position.
Figure 8:
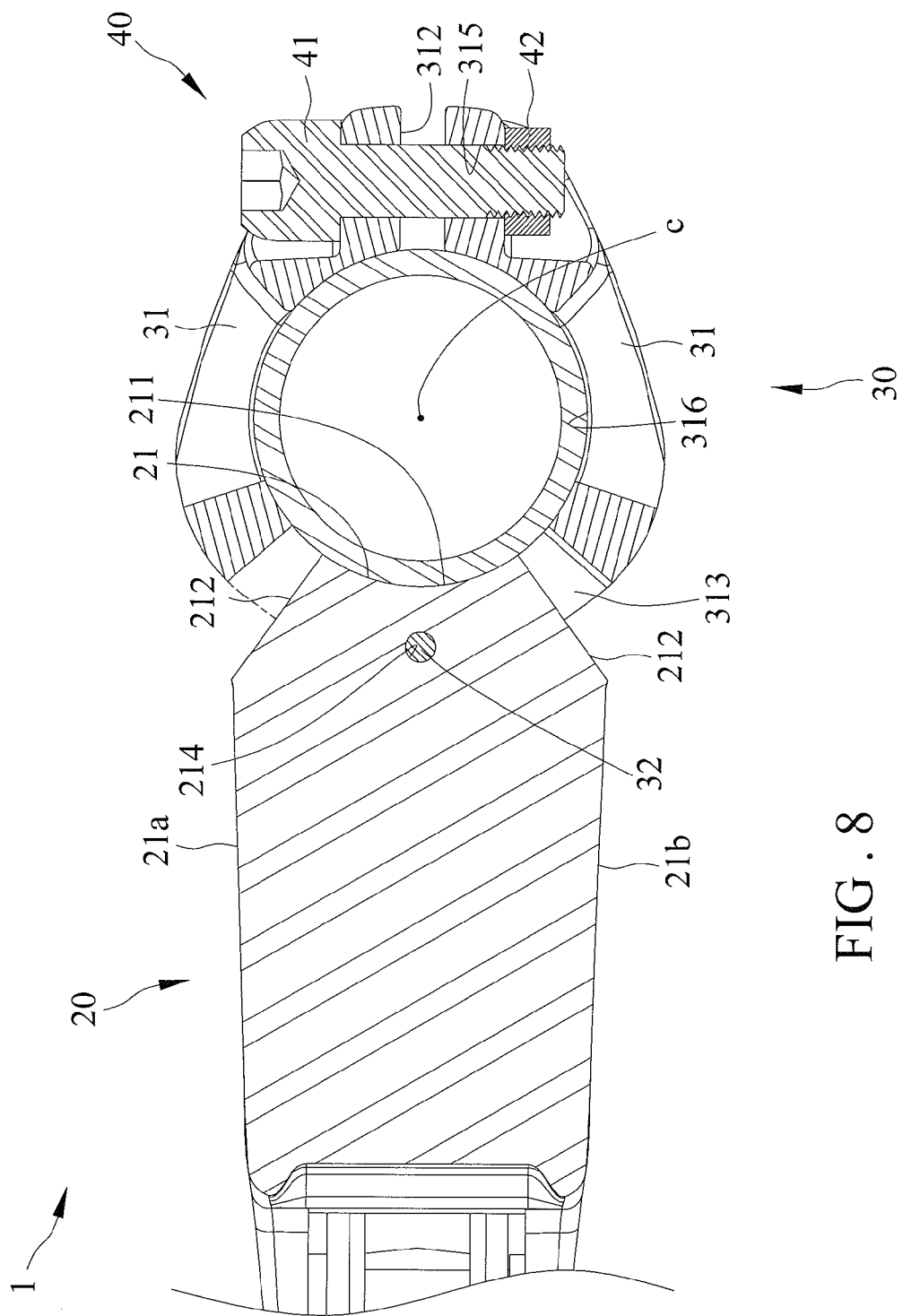
FIG. 8 illustrates the clamping unit in a clamping position.

Referring to FIG. 6 through FIG. 8, the clamping unit 30 is pivotally moved between an open position (as shown in FIG. 6) and a clamping position (as shown in FIG. 8). While the clamping unit 30 is in the open position, the clamping elements 31 are detached from each other to facilitate the installation of the handle tube. The slants 212 can prevent the curved portions 316 of the clamping elements 31 from interfering with the frame 20 and enlarging the moving area of the clamping elements 31. While the clamping unit 30 is in the second position, the clamping elements 31 are close to each other. The curved surface 211 and the curved portion 316 are abutted against the handle tube. The clamping unit 30 can tightly mount onto the handle tube via the fastener 40.

Figure 9:
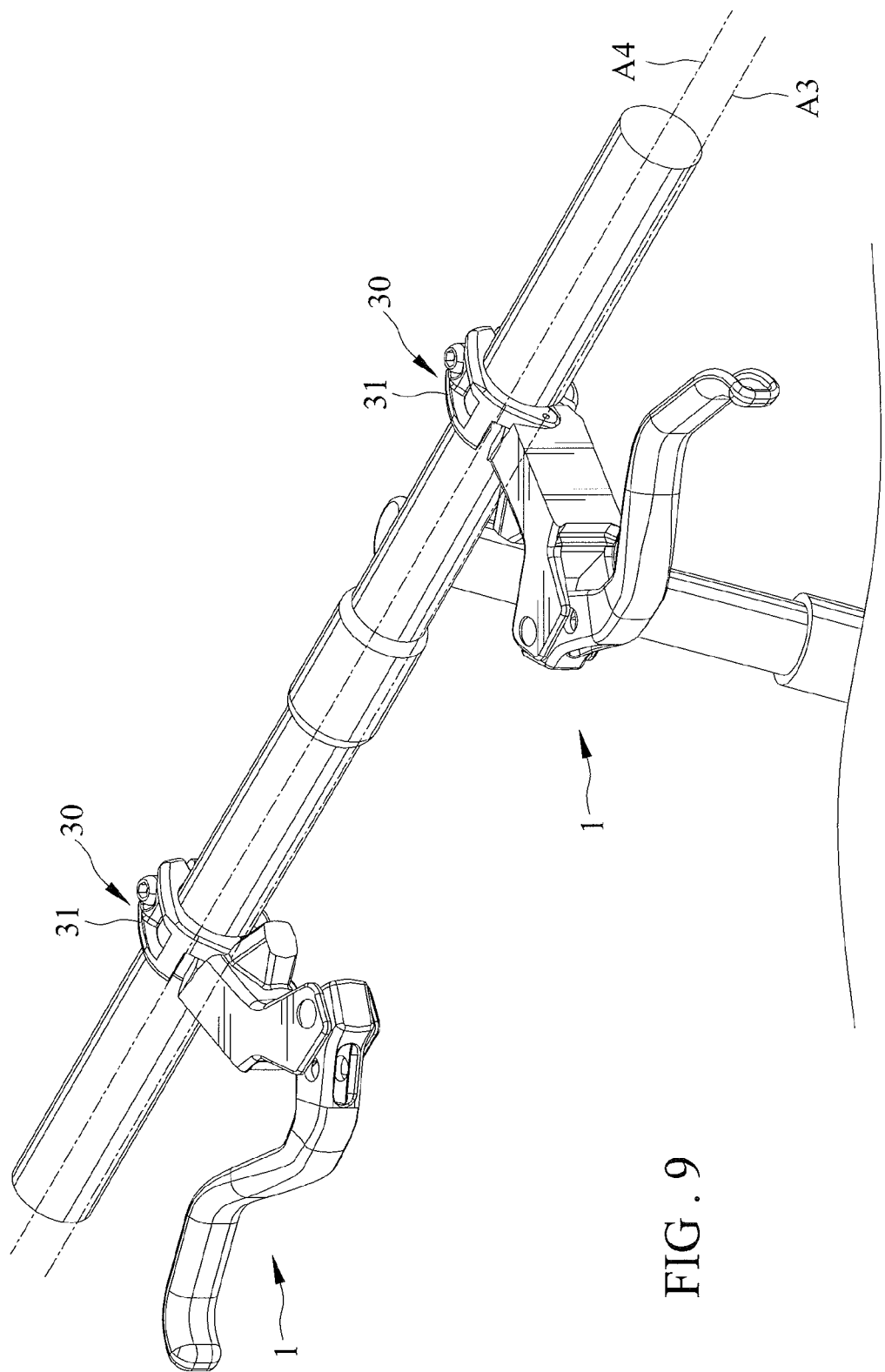
FIG. 9 illustrates two clamp devices respectively installed onto both sides of the handle tube.

Referring to FIG. 9, the handle has a fourth axis A4 along the longitudinal axle thereof. The third axis A3 is parallel with respect to the fourth axis A4. Further, each clamping element 31 has a profile the same with each other and is symmetrically disposed with each other. In this embodiment, while the clamp device 1 installed onto a first side of the handle, one of the clamping elements 31, named a first clamping element, is abutted against the upper periphery of said first side of the handle, and the other clamping element 31, named a second clamping element, is abutted against the lower periphery of said first side of the handle. While the clamp device 1 is installed onto a second side of the handle opposite from said first side, the first clamping element is abutted against the lower periphery of said second side of the handle, and the second clamping element is abutted against the upper periphery of said second side of the handle. Hence, the clamp device 1 is able to be installed onto different sides of the handle, and the cost is decreased.

Figure 10:
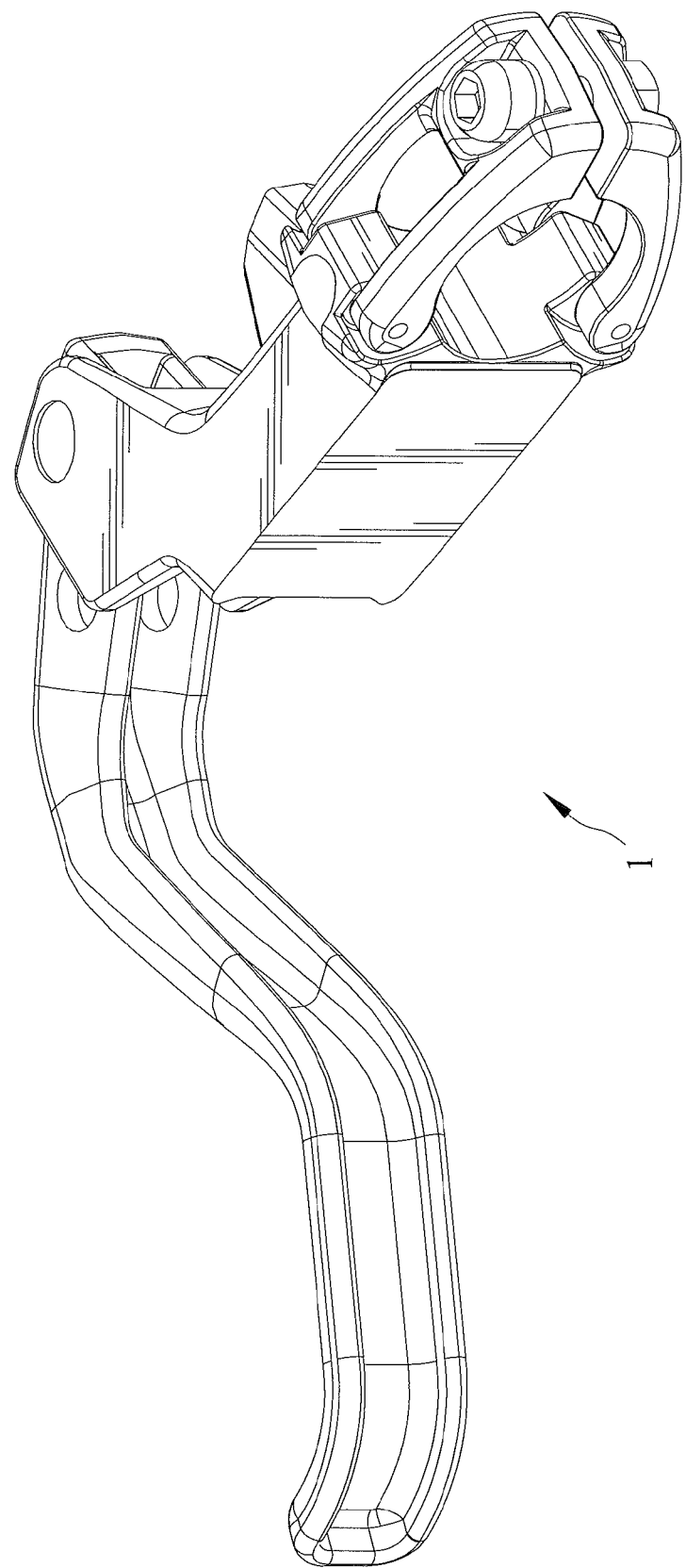
FIG. 10 is a perspective view of the clamp device according to a second embodiment of the present invention.
Figure 11:
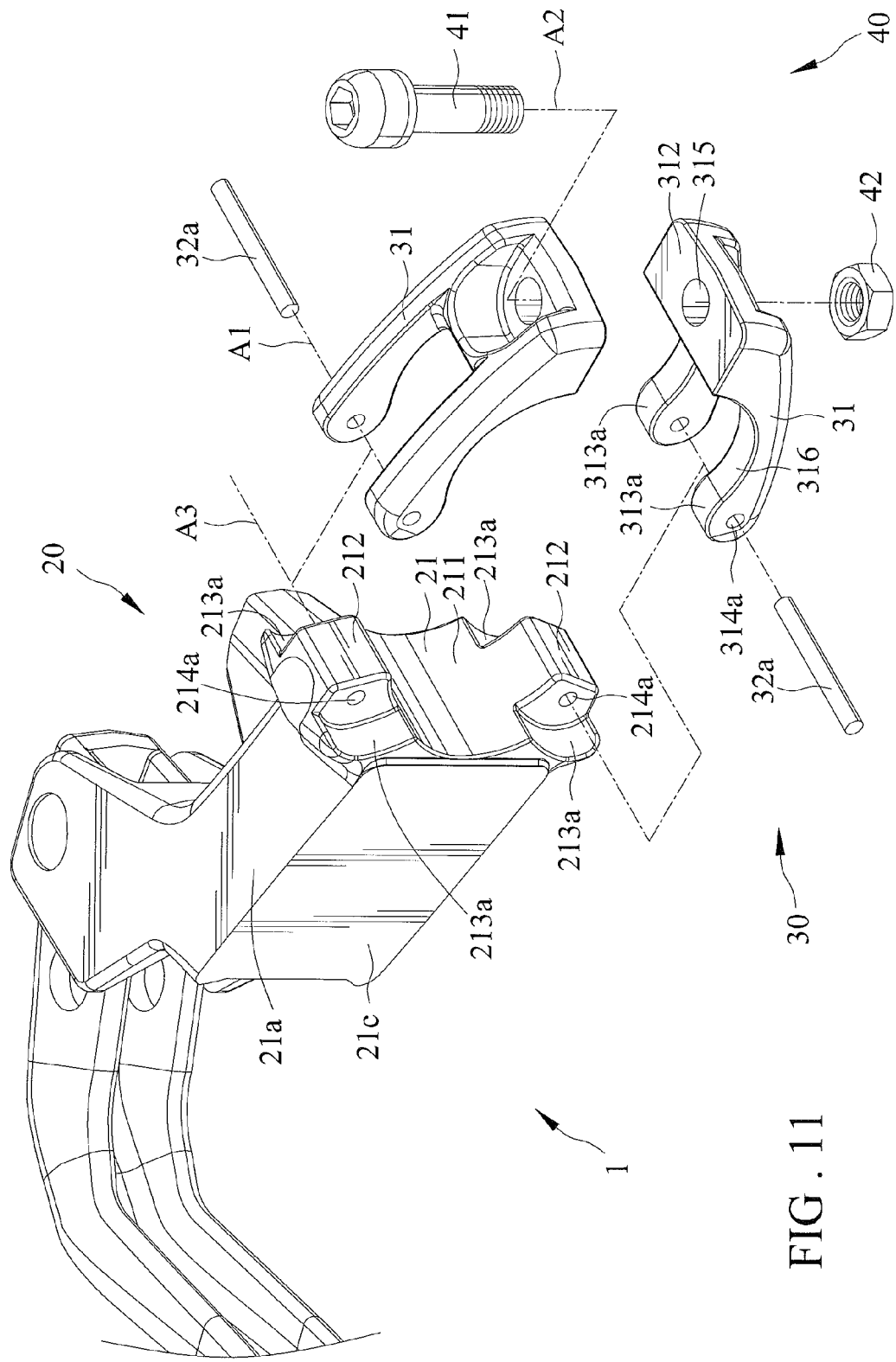
FIG. 11 is an exploded perspective view of the clamp device according to the second embodiment of the present invention.

Referring to FIG. 10 through FIG. 12, there is shown a clamp device 1 according to a second embodiment of the present invention. The second embodiment is like the first embodiment except that the supporting portion 21 has two apertures 214a, which are parallel and spaced with each other, and four recesses 213a. Two of the recesses 213a are formed on one of the lateral sides 21c. The other two of the recesses 213a are formed on the other one of the lateral sides 21c. Each recess 213a is in communication with an end of related aperture 214a. Each clamping element 31 has two pivoting arms 313a formed thereon. Each pivoting arm 313a forms an opening 314a, and the openings 314a are coaxial with each other. The pivoting arms 313a are respectively disposed in the recesses 213. The clamping unit 30 has two pins 32a respectively installed to the clamping elements 31. The two pivoting arms 313a can increase the strength of the clamping elements 31.

What is claimed is:

1. A clamp device comprising:
   a frame including a supporting portion formed on one end thereof, wherein the supporting portion has a curved surface adapted for abutting against a handle tube, and
   a clamping unit pivotally connected to the frame and including a first side and a second side opposite to the first side, with each of the first and second sides forming a slant, with the tangent plane of the slant crossing a center of the curved surface of the supporting portion, with the clamping unit including two clamping elements, wherein each clamping element has a connecting portion on one end, a coupling portion on the other end opposite to the connecting portion, and a curved portion between the connecting portion and the coupling portion;
   wherein the clamping unit is pivotally moved between an open position and a clamping position, wherein the two clamping elements are detached from each other in the open position and the two clamping elements are close to each other in the clamping position; and
   wherein the slant of each of first and second side abuts with one of the two clamping elements in the open position and prevents the curved portions of the clamping element from interfering with the frame and enlarges a moving area of the two clamping elements.

2. The clamp device as claimed in claim 1, wherein the clamping unit further includes a pin connecting the two clamping elements and the supporting portion of the frame.

3. The clamp device as claimed in claim 1, wherein the supporting portion has the curved surface on a distal end thereof.

4. The clamp device as claimed in claim 3, wherein the curved portions are utilized to abut against the handle tube, wherein each curved portion has a curvature radius the same as the curved surface of the frame.

5. The clamp device as claimed in claim 3, wherein the clamping unit further includes two pins, wherein the supporting portion has a first side, a second side opposite to the first side, and two lateral sides opposite to each other, wherein the lateral sides extend between the first side and the second side, wherein the supporting portion has two apertures parallel and spaced with each other, and four recesses, wherein two of the four recesses are formed on one of the two lateral sides, wherein the other two of the four recesses are formed on another one of the two lateral sides, with each recess in communication with an end of related aperture, wherein the connecting portion of each clamping element forms two pivoting arm thereon, with the pivoting arm respectively disposed in the recesses, wherein each pivoting arm forms a through hole corresponding to the aperture of the frame, and wherein the pin is inserted through the aperture and the through holes.

6. The clamp device as claimed in claim 1, further comprising a fastener installed to the clamping unit, wherein the coupling portion has an opening adapted for associating with the fastener.

7. The clamp device as claimed in claim 1, with each clamping element having a profile the same with each other.

8. The clamp device as claimed in claim 7, with each clamping element symmetrically disposed with each other.

9. The clamp device as claimed in claim 1, with each clamping element symmetrically disposed with each other.

10. The clamp device as claimed in claim 1, wherein one of the clamping elements is abutted against an upper periphery of one side of the handle, and wherein the other clamping element is abutted against a lower periphery of the side of the handle.

11. A clamp device comprising:
a frame including a supporting portion formed on one end thereof, wherein the supporting portion is adapted for abutting against a handle tube; and
a clamping unit pivotally connected to the frame, with the clamping unit including two clamping elements, wherein each clamping element has a connecting portion on one end, a coupling portion on the other end opposite to the connecting portion, and a curved portion between the connecting portion and the coupling portion,
wherein the clamping unit is pivotally moved between an open position and a clamping position, wherein the clamping elements are detached from each other in the open position, and wherein the clamping elements are close to each other in the clamping position, and
wherein the supporting portion has a curved surface on a distal end thereof, and wherein the curved surface is adapted for abutting against the handle tube and has a center defined thereon,
wherein the clamping unit further includes a pin, wherein the supporting portion has a first side, a second side opposite to the first side, and two lateral sides opposite to each other, wherein the two lateral sides extend between the first side and the second side, wherein the supporting portion has an aperture extending from one of the two lateral sides to another one of the two lateral sides, wherein the supporting portion further forms two recesses on the lateral sides, respectively, with each recess in communication with an end of the aperture, wherein the connecting portion of each clamping element forms a pivoting arm corresponding to the recess of the frame, wherein the pivoting arm forms a through hole corresponding to the aperture of the frame, wherein the pin is inserted through the aperture and the through hole.

12. The clamp device as claimed in claim 11, wherein each of the first and second sides forms a slant, and wherein the tangent plane of the slant crosses the center.

13. The clamp device as claimed in claim 11, wherein the coupling portion has an opening, wherein the through hole has a first axis along the longitudinal axle thereof, wherein the opening has a second axis perpendicular to the longitudinal axle thereof, wherein the aperture has a third axis along the longitudinal axle thereof, and wherein the first axis is perpendicular with respect to the second axis and is parallel with respect to the third axis.

* * * * *